United States Patent [19]

Yasuda et al.

[11] Patent Number: 4,958,140
[45] Date of Patent: Sep. 18, 1990

[54] COMPARATOR UNIT FOR DATA DISCRIMINATION

[75] Inventors: Sadahiro Yasuda; Yukihiro Nishiguchi, both of Tokyo, Japan

[73] Assignee: NEC Corporation, Tokyo, Japan

[21] Appl. No.: 324,814

[22] Filed: Mar. 17, 1989

[30] Foreign Application Priority Data

Mar. 18, 1988 [JP] Japan .................................. 63-66453

[51] Int. Cl.⁵ .............................................. G06F 7/04
[52] U.S. Cl. .................................................. 340/146.2
[58] Field of Search ........................................ 340/146.2

[56] References Cited

U.S. PATENT DOCUMENTS

| | | | |
|---|---|---|---|
| 4,012,714 | 3/1977 | Lohmann | 340/146.2 |
| 4,031,511 | 6/1977 | Britton | 340/146.2 |
| 4,255,740 | 3/1981 | Ferrie | 340/146.2 |
| 4,857,882 | 8/1989 | Wagner et al. | 340/146.2 |

*Primary Examiner*—Gary V. Harkcom
*Assistant Examiner*—Tan V. Mai
*Attorney, Agent, or Firm*—Foley & Lardner, Schwartz, Jeffery, Schwaab, Mack, Blumenthal & Evans

[57] ABSTRACT

A comparator unit for discriminating input data bit groups has a first logical circuit to compare an input data bit group with a reference data bit group and produce a consistent data bit group or an inconsistent data bit group. A second logical circuit responds to a masking data bit group and converts the inconsistent data bit group into the consistent data bit group when the masking data bit group specifies a part of the input data bits where the inconsistency takes place. Therefore, a plurality of predetermined data bit groups are detectable on the basis of the single reference data bit group.

7 Claims, 8 Drawing Sheets

PRIOR-ART

PRIOR-ART

PRIOR-ART

PRIOR-ART

COMPARATOR UNIT FOR DATA DISCRIMINATION

FIELD OF THE INVENTION

This invention relates to a comparator unit and, more particularly, to a comparator unit for discriminating a predetermined data bit group such as address data bits or numeric data bits from a plurality of candidates.

BACKGROUND OF THE INVENTION

A typical example of the comparator unit is shown in FIG. 1 and largely comprises a four-bit register 1 coupled to a first four-bit data bus system 2, a second four-bit data register 5 coupled to a second four-bit data bus system 6, and a comparator circuit 7 coupled at input ports thereof to both data registers 1 and 5, respectively. Such a comparator unit is, by way of example, incorporated in a semiconductor memory device and used for detecting predetermined input data bits in many input data bit groups which are representative of address locations, numeric data or instructions.

The first four-bit data register 1 has four latch circuits 8, 9, 10 and 11 arranged in parallel, and each of the latch circuits 8, 9, 10 and 11 comprises two inverter circuits 25 and 26 coupled in series for memorizing a data bit and two n-channel type field effect transistors 27 and 28 one of which is coupled between the first data bus system 2 and the inverter circuit 12 and responsive to a latching signal S1 for taking the data bit therein and the other of which is coupled between the inverter circuits 13 and 12 and responsive to a retaining signal S2 for allowing the series combination of the inverter circuits 12 and 13 to retain the data bit. Input data bit groups are serially supplied from the first data bus system 2 to the first data register 1 and memorized thereinto.

The second data register 5 also has four latch circuits 12, 13, 14 and 15 each provided with two inverter circuits 16 and 17 and two n-channel type field effect transistor 18 and 19. Each of the latch circuits 12, 13, 14 and 15 is similar in circuit behavior to the latch circuit 8, so that a reference data bit group is supplied from the second data bus system 6 and latched thereinto in response to a latching signal S3 and a retaining signal S4. The comparator circuit 7 comprises four two-input exclusive-OR gates 20, 21, 22 and 23 each coupled to both data registers 1 and 5 and a four-input NOR gate 24 coupled to the exclusive-OR gates 20, 21, 22 and 23.

In operation, when the reference data bit group (0101) is supplied to the second data bus system 6, the latch circuits 12, 13, 14 and 15 are responsive to the latching signal S3 to take the reference data bit group thereinto and, then, to the retaining signal S4 to memorize the reference data bit group thereinto. After the reference data bit group is memorized into the second data register 5, input data bit groups are successively supplied to the first data bus system 2, and the first data register 1 is responsive to the latching signal S1 and, then, the retaining signal S2 for memorizing the data bit groups in succession. If the input data bit groups have respective bit strings shown in Table 1, the exclusive-OR gates to 23 and, accordingly, the NOR gate 24 produces the output signals which are also indicated in Table 1.

TABLE 1

|   | First data register 1 | Second data register 5 | EX-OR 23 | EX-OR 22 | EX-OR 21 | EX-OR 20 | NOR 24 |
|---|---|---|---|---|---|---|---|
| 0 | 0000 | 0101 | 0 | 1 | 0 | 1 | 0 |
| 1 | 0001 | 0101 | 0 | 1 | 0 | 0 | 0 |
| 2 | 0010 | 0101 | 0 | 1 | 1 | 1 | 0 |
| 3 | 0011 | 0101 | 0 | 1 | 1 | 0 | 0 |
| 4 | 0100 | 0101 | 0 | 0 | 0 | 1 | 0 |
| 5 | 0101 | 0101 | 0 | 0 | 0 | 0 | 1 |
| 6 | 0110 | 0101 | 0 | 0 | 1 | 1 | 0 |
| 7 | 0111 | 0101 | 0 | 0 | 1 | 0 | 0 |
| 8 | 1000 | 0101 | 1 | 1 | 0 | 1 | 0 |
| 9 | 1001 | 0101 | 1 | 1 | 0 | 0 | 0 |
| A | 1010 | 0101 | 1 | 1 | 1 | 1 | 0 |
| B | 1011 | 0101 | 1 | 1 | 1 | 0 | 0 |
| C | 1100 | 0101 | 1 | 0 | 0 | 1 | 0 |
| D | 1101 | 0101 | 1 | 0 | 0 | 0 | 0 |
| E | 1110 | 0101 | 1 | 0 | 1 | 1 | 0 |
| F | 1111 | 0101 | 1 | 0 | 1 | 0 | 0 |

Thus, the prior-art comparator unit is operative to detect the input data bit group identical in bit string with the reference data bit group. However, when the comparator unit forms part of a data processing system shown in FIG. 2 and serves as an address space discriminating circuit, a problem is encountered in circuit complexity. In detail, in the data processing system the comparator unit 31 is supplied with a reference address data bit group through the second bus system 6 and with an address data bit group through the first bus system 2 for the comparison. If the address space shown in FIG. 3 is provided to the data processing system, a central processing unit 32 needs to enter the wait state in at address locations 5 and D, because of a difference in operation speed between the central processing unit 32 and a memory unit 33 or an interface unit 34. For this reason, the central processing unit 32 provides the reference address data bit groups representative of the address location 5 and D to the comparator unit 31 through the second bus system 6, and the address data bits groups are successively latched into the comparator unit 31 for detecting the address locations 5 and D. FIG. 4 shows the discriminating operation for the address location 5. The reference address data bit group representative of the address location 5 is latched in the comparator unit 31 at time t1 and retained at time t2. If the address data bit group is indicative of the address locations 5 (at time t3) and D, the comparator unit 31 produces a detecting signal and causes a wait-state controller 35 to produce a wait control signal which is supplied to the central processing unit 32.

In this usage, the comparator unit 31 is expected to detect the two different address locations 5 and D, so that it is necessary to have two second data registers 41 and 42 for the address locations 5 and D, two comparator circuits 43 and 44 and a OR gate as shown in FIG. 5. Even if the first data resistor 46 is shared by the comparator circuits 43 and 44, the dualization makes the comparator unit 31 complicate.

SUMMARY OF THE INVENTION

It is therefore an important object of the present invention to provide a comparator unit which is simple in circuit arrangement.

In accordance with the present invention, there is provided a comparator unit for discriminating a plurality of predetermined input data bit groups from a plurality of input data bit groups, each input data bit group consisting of a plurality of input data bits, comprising (a) a first data register operative to store one of the input data bit groups, (b) a second data register operative to store a reference data bit group consisting of a plurality of reference data bits and identical in bit string with one of the predetermined input data bit groups, (c) a third data register operative to store a masking data bit group having at least one mask data bit, and (d) a comparator circuit having a first logical circuit, a second logical circuit and a third logical circuit, the first logical circuit being operative to compare aforesaid one of the input data bit groups with the reference data bit group for producing a consistent data bit group representative of the consistency between the input data bits and the corresponding reference data bits or an inconsistent, data bit group representative of the inconsistency between at least a part of the input data bits and the corresponding reference data bits, the second logical circuit being responsive to the masking data bit group and operative to convert the inconsistent data bit group into the consistent data bit group when the part of the input data bits is specified by the mask data bit, the third logical circuit being responsive to the consistent data bit group for producing a detecting signal.

BRIEF DESCRIPTION OF THE DRAWINGS

The features and advantages of a comparator unit according to the present invention will be more clearly understood from the following description taken in conjunction with the accompanying drawings in which.

DESCRIPTION OF THE PREFERRED EMBODIMENTS

First embodiment

Figure 6:
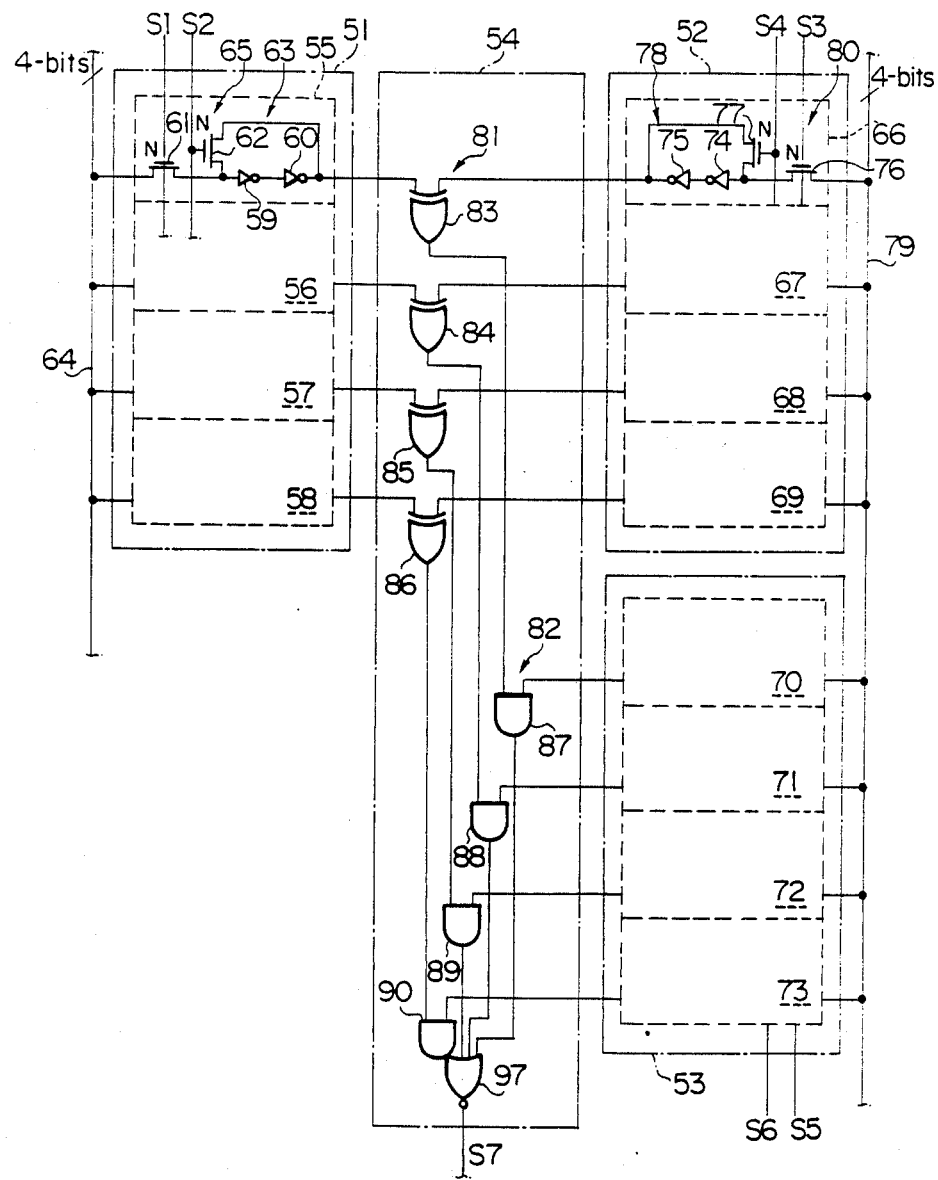
FIG. 6 is a circuit diagram showing the arrangement of a comparator unit embodying the present invention.

Referring first to FIG. 6 of the drawings, a comparator unit embodying the present invention largely comprises a single first data register 51, a second data register 52, a third data register 53 and a comparator circuit 54. The first data register 51 is provided with four latch circuits 55, 56, 57 and 58, and all of the latch circuits 55 to 58 are similar in circuit arrangement, so that description is made for the latch circuit 55 only. The latch circuit 55 has two inverter circuits 59 and 60 and two n-channel type field effect transistor 61 and 62, and the two inverter circuits 59 and 60 form in combination a retaining circuit 63 for memorizing a data bit. The n-channel type field effect transistor 61 is coupled between a first multiple-bit bus system 64 and gated by a latching signal S1, and the n-channel type field effect transistor 62 is coupled between the inverter circuits 59 and 60 and gated by a retaining signal S2, so that an input data bit group is stored in the first data register 51 through sequential gate operations with the latching signal S1 and the retaining signal S2. The two n-channel type field effect transistor 61 and 62 as a whole constitute a switching circuit 65.

Each of the second and third data registers 52 and 53 is provided with four latch circuits 66, 67, 68 and 69 or 70, 71, 72 and 73, and all of the latch circuits are similar in circuit arrangement to one another. For this reason, the latch circuit 66 is described only. The latch circuit 66 has two inverter circuits 74 and 75 and two n-channel type field effect transistor 76 and 77, and the two inverter circuits 74 and 75 form in combination a retaining circuit 78 for memorizing a data bit. The n-channel type field effect transistor 76 is coupled between a second multiple-bit bus system 79 and gated by a latching signal S3, and the n-channel type field effect transistor 77 is coupled between the inverter circuits 74 and 75 and gated by a retaining signal S4, so that a reference data bit group is stored in the second data register 66 through sequential gate operations with the latching signal S3 and the retaining signal S4. The two n-channel type field effect transistor 61 and 62 as a whole constitute a switching circuit 80. On the other hand, the third data register 53 is responsive to a latching signal S5 and a retaining signal S6 and memorizes a masking data bit group thereinto.

The comparator circuit 54 has a first logical circuit 81 and a second logical circuit 82 which are provided in association with the second and third data registers 52 and 53, respectively. Namely, the first logical circuit 81 is provided with four exclusive-OR gates 83, 84, 85 and 86, and the exclusive-OR gates 83 to 86 are respectively coupled at two input nodes thereof to the first data register 51 and the second data register 52. The first logical circuit 81 is operative to decide whether or not the input data bit group is identical in bit string with the reference data bit group.

On the other hand, the second logical circuit 82 is provided with four AND gates 87, 88, 89 and 90 which are coupled at two input nodes thereof to the exclusive-OR gates 83 to 86 and the third data register 53. The second logic circuit 82 executes a masking operation on the basis of the masking data bit group, and, for this reason, at least one of the output bits of the first logical circuit 81 is masked by the second logic circuit 82. The comparator circuit 54 further has a NOR gate 91 which is coupled at four input nodes thereof to the AND gates 87, 88, 89 and 90 to producing a detecting signal S7.

Each exclusive-OR gate produces the output bit of logic "0" level when both input bits are identical in logic level, so that the first logical circuit 81 produces the four bits of logic "0" level if the input data bit group is identical in bit string with the reference data bit group. On the other hand, each AND gate yields logic "0" level in so far as at least one input data bit is logic "0" level. If the masking data bit group has a bit of logic "0" level, the associated AND gate produces the output bit of logic "0" regardless of the output bit of the exclusive-OR gate. That is, the AND gate is capable of masking the output bit of the exclusive-OR gate. These functions are indicated by Table 2.

TABLE 2

|   | First register | Second register | Third register | EX-OR 86 | EX-OR 85 | EX-OR 84 | EX-OR 83 | NOR 91 |
|---|---|---|---|---|---|---|---|---|
| 0 | 0000 | 0101 | 0111 | 0 | 1 | 0 | 1 | 0 |
| 1 | 0001 | 0101 | 0111 | 0 | 1 | 0 | 0 | 0 |
| 2 | 0010 | 0101 | 0111 | 0 | 1 | 1 | 1 | 0 |
| 3 | 0011 | 0101 | 0111 | 0 | 1 | 1 | 0 | 0 |
| 4 | 0100 | 0101 | 0111 | 0 | 0 | 0 | 1 | 0 |
| 5 | 0101 | 0101 | 0111 | 0 | 0 | 0 | 0 | 1 |
| 6 | 0110 | 0101 | 0111 | 0 | 0 | 1 | 1 | 0 |
| 7 | 0111 | 0101 | 0111 | 0 | 0 | 1 | 0 | 0 |
| 8 | 1000 | 0101 | 0111 | 1 | 1 | 0 | 1 | 0 |
| 9 | 1001 | 0101 | 0111 | 1 | 1 | 0 | 0 | 0 |
| A | 1010 | 0101 | 0111 | 1 | 1 | 1 | 1 | 0 |
| B | 1011 | 0101 | 0111 | 1 | 1 | 1 | 0 | 0 |
| C | 1100 | 0101 | 0111 | 1 | 0 | 0 | 1 | 0 |
| D | 1101 | 0101 | 0111 | 1 | 0 | 0 | 0 | 1 |
| E | 1110 | 0101 | 0111 | 1 | 0 | 1 | 1 | 0 |
| F | 1111 | 0101 | 0111 | 1 | 0 | 1 | 0 | 0 |

Figure 1:
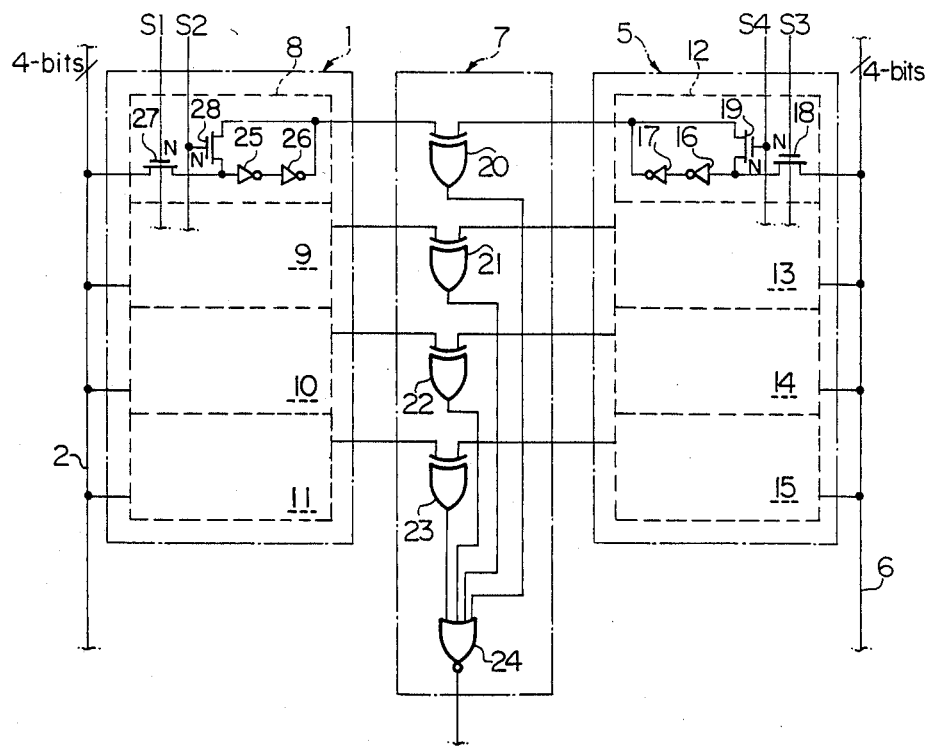
FIG. 1 is a circuit diagram showing the arrangement of a typical example of the prior-art comparator unit.
Figure 2:
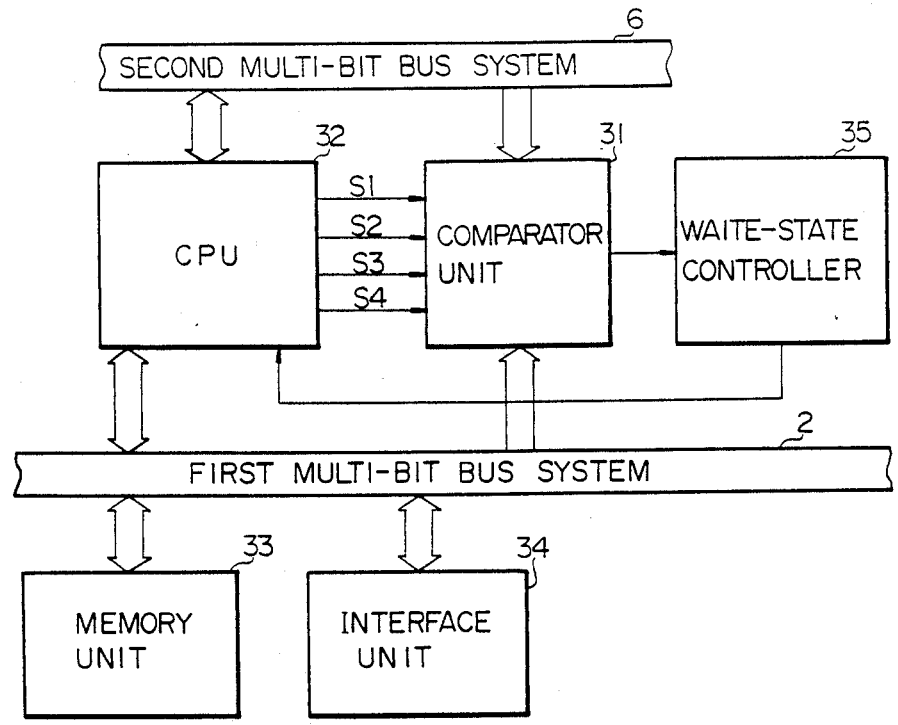
FIG. 2 is a block diagram showing the arrangement of a data processing system provided with the prior-art comparator unit.
Figure 3:
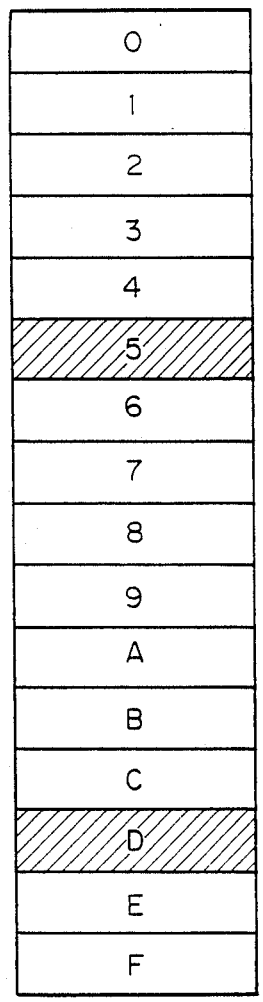
FIG. 3 is a view showing an address space provided for the data processing system shown in FIG. 2.
Figure 4:
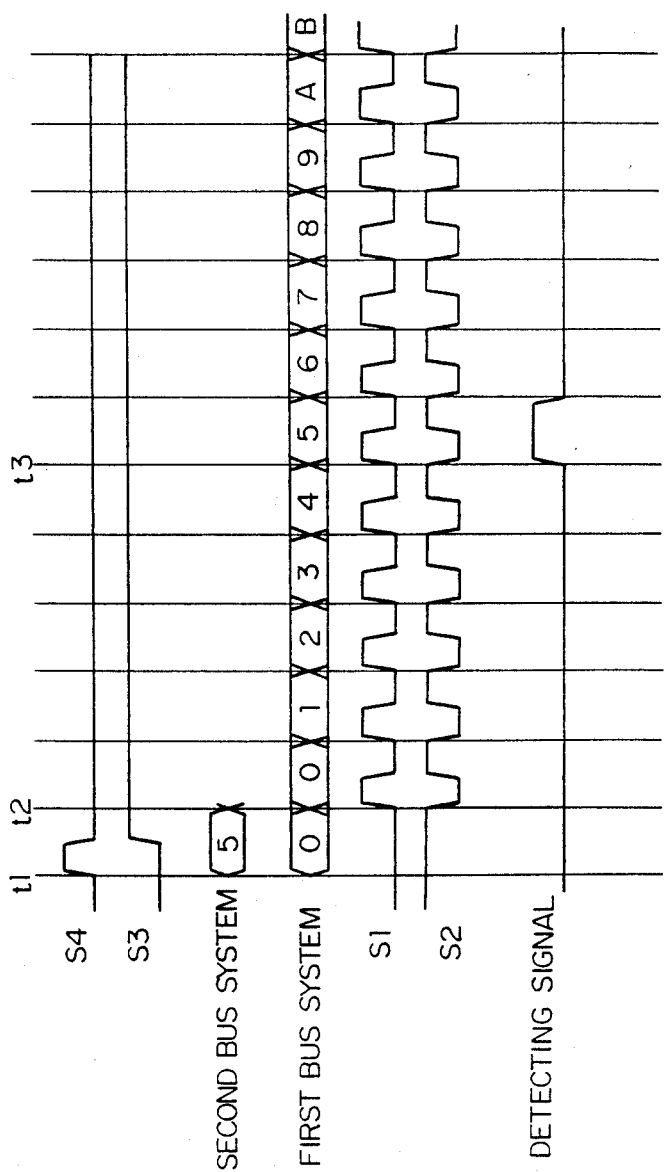
FIG. 4 is a timing chart showing the operation of the data processing system shown in FIG. 2.
Figure 5:
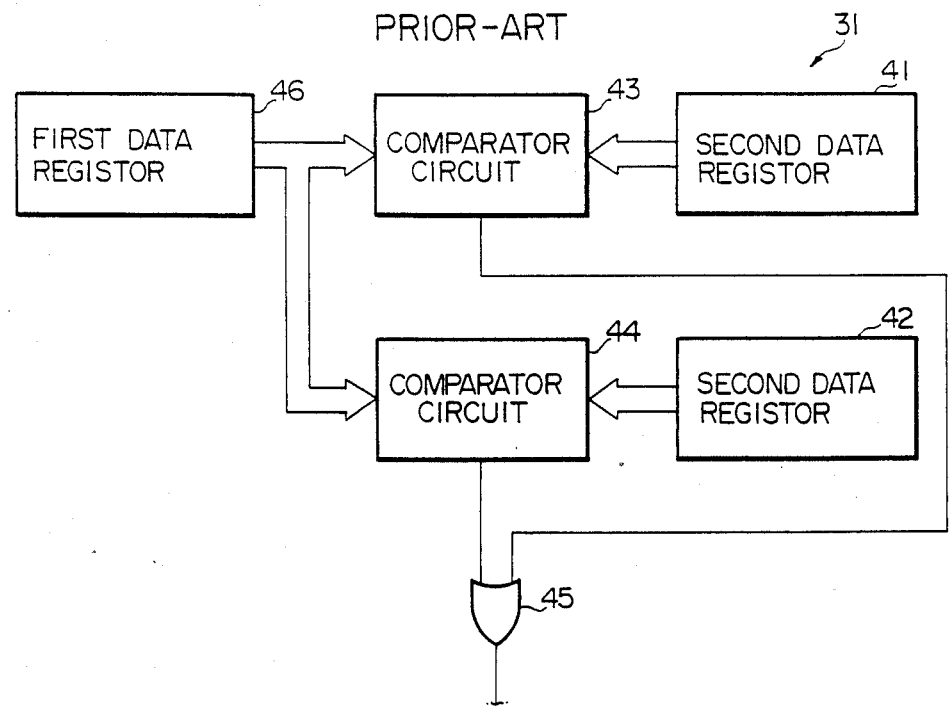
FIG. 5 is a block diagram showing the arrangement of a prior-art comparator unit incorporated in the data processing system shown in FIG. 2.
Figure 7:
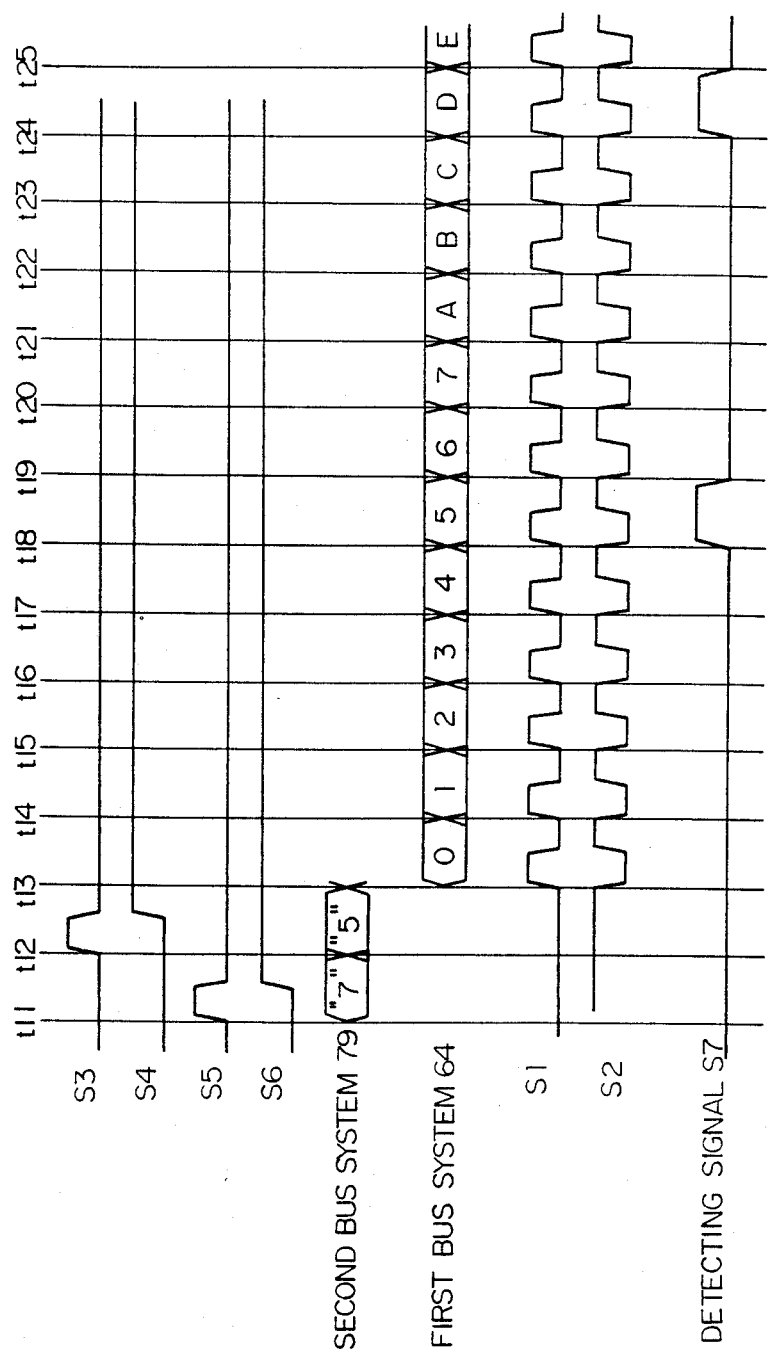
FIG. 7 is a timing chart showing the discriminating operation of the comparator unit shown in FIG. 6.

Description is hereinunder made for an address space discriminating operation with the assumption that the comparator unit illustrated in FIG. 6 is installed in a data processing system corresponding to that shown in FIG. 2 and that address locations "5 and "D" should be detected for causing the central processing unit to enter into the wait-state. As shown in FIG. 7, if the latching signal S5 and the retaining signal S6 are shifted to a high voltage level at times t11 and t12, respectively, the masking data bit group with value "7" is memorized into the third data register 53 and the masking data bit group with value "7" has a bit string "0111". At times t12 and 13, the second data register 52 is responsive to the latching signal S3 and the retaining signal S4 and memorizes the reference data bit group indicative of the address location "5". The multiple-bit first data bus system 64 sequentially propagates the input data bit groups representative of the address location "0" to the address location "E" which are successively memorized into the first data register 51 in response to the latching signal S1 and the retaining signal S2 alternatively shifted between the high voltage level and the low voltage level. If the input data bit group representative of the address location "5" is stored in the first data register 51, all of the exclusive-OR gates 83 to 86 produces the output bits of logic "0" level. In this situation, All of the AND gates 87 to 90 produces the output bits of logic "0" level, and, for this reason, the detecting signal S7 is shifted to the high voltage level at time t18. The discriminating operation proceeds to the address location "D". The address location "D" has the bit string (1101), so that exclusive-OR gates 87 to 89 produce the respective output bits of logic "0" level, however, the exclusive-OR gate 86 yields the output bit of "1" due to the discrepancy of the input bits. The AND gate 90 is then supplied with the output bit of logic "1" from the exclusive-OR gate 86 and with the output bit of logic "0" from the latch circuit 73. This results in that the AND gate 90 produces the output bit of logic "0" level. In other words, the output bit of logic "1" level is masked by the AND gate 90 supplied with the output bit of logic "0" level. Then, the detecting signal S7 goes up to the high voltage level at time 24.

Second embodiment

Figure 8:
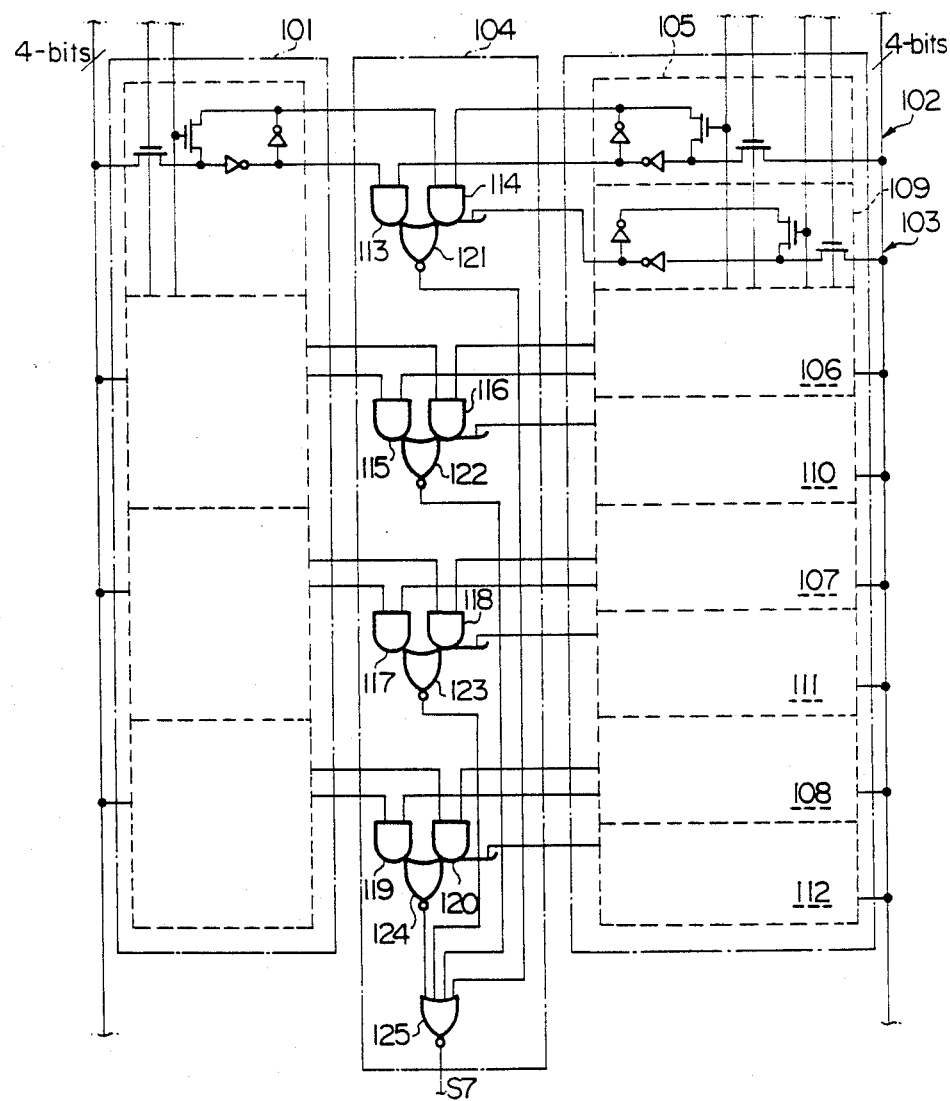
FIG. 8 is a circuit diagram showing the arrangement of another comparator unit embodying the present invention.

Turning to FIG. 8 of the drawings, another comparator unit largely comprises first, second and third data registers 101, 102 and 103 and a comparator circuit 104. The first data register 101 is similar in circuit arrangement to the first data register 51, however, the second and third data registers 102 and 103 have respective latch circuits alternatively arranged. Namely, the second data register has latch circuits 105 to 108, and the third data register 103 has latch circuits 109, 110, 111 and 112. All of the component latch circuits are similar to that illustrated in FIG. 6, so that no further description is hereinunder incorporated.

In this embodiment, AND gates 113 to 120 as a whole constitute a first logical circuit for detecting the consistency between the input data bit group and the reference data bit group. Four NOR gates 121 to 124 are provided for implementing a second logical circuit for masking operation, and the detecting signal S7 is produced by a NOR gate 125.

Detecting operations are summarized in Table 3.

TABLE 3

|   | First register | Second register | Third register | NOR 124 | NOR 123 | NOR 122 | NOR 121 | NOR 125 |
|---|---|---|---|---|---|---|---|---|
| 0 | 0000 | 0101 | 0111 | 0 | 1 | 0 | 1 | 0 |
| 1 | 0001 | 0101 | 0111 | 0 | 1 | 0 | 0 | 0 |
| 2 | 0010 | 0101 | 0111 | 0 | 1 | 1 | 1 | 0 |
| 3 | 0011 | 0101 | 0111 | 0 | 1 | 1 | 0 | 0 |
| 4 | 0100 | 0101 | 0111 | 0 | 0 | 0 | 1 | 0 |
| 5 | 0101 | 0101 | 0111 | 0 | 0 | 0 | 0 | 1 |
| 6 | 0110 | 0101 | 0111 | 0 | 0 | 1 | 1 | 0 |
| 7 | 0111 | 0101 | 0111 | 0 | 0 | 1 | 0 | 0 |
| 8 | 1000 | 0101 | 0111 | 0 | 1 | 0 | 1 | 0 |
| 9 | 1001 | 0101 | 0111 | 0 | 1 | 0 | 0 | 0 |

TABLE 3-continued

|   | First register | Second register | Third register | NOR 124 | NOR 123 | NOR 122 | NOR 121 | NOR 125 |
|---|---|---|---|---|---|---|---|---|
| A | 1010 | 0101 | 0111 | 0 | 1 | 1 | 1 | 0 |
| B | 1011 | 0101 | 0111 | 0 | 1 | 1 | 0 | 0 |
| C | 1100 | 0101 | 0111 | 0 | 0 | 0 | 1 | 0 |
| D | 1101 | 0101 | 0111 | 0 | 0 | 0 | 0 | 1 |
| E | 1110 | 0101 | 0111 | 0 | 0 | 1 | 1 | 0 |
| F | 1111 | 0101 | 0111 | 0 | 0 | 1 | 0 | 0 |

Although particular embodiments of the present invention have been shown and described, it will be obvious to those skilled in the art that various changes and modifications may be made without departing from the spirit and scope of the present invention.

What is claimed is:

1. A comparator unit for discriminating a plurality of predetermined input data bit groups from a plurality of input data bit groups, each input data bit group consisting of a plurality of input data bits, comprising:
   (a) a first data register operative to store one of said input data bit groups;
   (b) a second data register operative to store a reference data bit group consisting of a plurality of reference data bits and identical in bit string with one of said predetermined input data bit groups;
   (c) a third data register operative to store a masking data bit group having at least one mask data bit; and
   (d) a comparator circuit having a first logical circuit, a second logical circuit and a third logical circuit, said first logical circuit being operative to compare said one of said input data bit groups with said reference data bit group for producing a consistent data bit group representative of the consistency between the input data bits and the corresponding reference data bits or an inconsistent data bit group representative of the inconsistency between at least a part of the input data bits and the corresponding reference data bits, said second logical circuit being responsive to said masking data bit group and operative to convert said inconsistent data bit group into said consistent data bit group when said part of said input data bits is specified by said mask data bit, said third logical circuit being responsive to said consistent data bit group for producing a detecting signal.

2. A comparator unit as set forth in claim 1, in which said first logical circuit comprises a plurality of exclusive-OR gates coupled in parallel between said first data register and said second data register.

3. A comparator unit as set forth in claim 2, in which said second logical circuit comprises a plurality of AND gates coupled in parallel between said exclusive-OR gates and said third data register.

4. A comparator unit as set forth in claim 3, in which said third logical circuit is formed by a NOR gate.

5. A comparator unit as set forth in claim 1, in which said first logical circuit comprises a plurality of AND gates respectively paired with a plurality of AND gates for forming a plurality of AND gate pairs and in which said AND gate pairs are coupled in parallel to said first data register and said second data register, wherein each AND pair is supplied with each of said input data bits, the complementary bit of said each input data bit, each of said reference data bits and the complementary bit of said each reference data bit.

6. A comparator unit as set forth in claim 5, in which said second logic circuit comprises a plurality of NOR gates respectively coupled to said AND gate pairs.

7. A comparator unit as set forth in claim 6, in which said third logic circuit comprises a NOR gate.

* * * * *